US 6,290,016 B1

(12) United States Patent
Umeoka

(10) Patent No.: US 6,290,016 B1
(45) Date of Patent: Sep. 18, 2001

(54) AIR CLEANER

(75) Inventor: Akio Umeoka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/539,718

(22) Filed: Mar. 31, 2000

(30) Foreign Application Priority Data

Mar. 31, 1999 (JP) .................................................. 11-090971

(51) Int. Cl.[7] .................................................. B62D 61/02
(52) U.S. Cl. ...................................... 180/219; 123/198 E
(58) Field of Search .......................... 180/219; 55/385.3, 55/320, 327; 123/198 E

(56) References Cited

U.S. PATENT DOCUMENTS

| | | | | |
|---|---|---|---|---|
| Re. 31,994 | * | 10/1985 | Tominaga et al. | 180/225 |
| 3,721,069 | * | 3/1973 | Walker | 55/319 |
| 4,280,582 | * | 7/1981 | Kouyama et al. | 180/219 |
| 4,396,407 | * | 8/1983 | Reese | 55/310 |
| 4,648,474 | * | 3/1987 | Shinozaki et al. | 180/219 |
| 4,666,473 | * | 5/1987 | Gerdan | 55/97 |
| 4,668,252 | * | 5/1987 | Gerdan | 55/191 |
| 5,454,859 | * | 10/1995 | Chiba et al. | 96/18 |
| 5,577,570 | * | 11/1996 | Shiohara et al. | 180/219 |
| 5,609,658 | * | 3/1997 | Takemura et al. | 55/385.3 |

FOREIGN PATENT DOCUMENTS 6019764   2/1985   (JP) .

* cited by examiner

Primary Examiner—J. J. Swann
Assistant Examiner—L. Lum
(74) Attorney, Agent, or Firm—Birch, Stewart, Kolasch & Birch, LLP

(57) ABSTRACT

To improve the durability of an air cleaner against water and dirt sucked in from a drain hole. An air cleaner includes an air cleaner element and a case cover. The inside of the air cleaner is partitioned into a clean room and a dirty room by an air cleaner element, and is aligned in a widthwise direction of the vehicle. The dirty room communicates with the atmosphere through an intake hole provided at an upper section, and a drain hole and a drain pipe are provided in a bottom wall section. A rib for supporting a lower end of the air cleaner element is provided above the bottom floor section, and is arranged so as to cross an extension of the axis of the drain pipe. Water and dirt that are sucked into the dirty room through the drainpipe and the drain hole by negative pressure inside the air cleaner have difficulty coming into direct contact with the air cleaner element because of the rib acting as a baffle plate.

11 Claims, 6 Drawing Sheets

AIR CLEANER

BACKGROUND OF THE INVENTION

1. Field of the Invention

The present invention relates to an air cleaner for a motorcycle type vehicle.

2. Description of Related Art

Japanese utility model laid-open No. Sho. 60-19764 discloses a structure having a drain hole provided in a lower part of a dirty room of an air cleaner, with a rubber cap as a one-way structure covering the drain hole. With this construction, water is only discharged from the inside of the dirty room to the outside.

The rubber cap in the above-described related art is a one-way structure. However, since there is negative pressure inside the air cleaner, there will inevitably be air penetrating into the air cleaner from gaps in the discharge ports provided in the rubber cap. At the same time, water and dirt contained in the penetrating air will invade into the inside of the air cleaner. Therefore, there is a danger that the water and dirt will stick directly to the air cleaner element. As a result, there is a need to improve the durability of the air cleaner element, etc. against this sort of water and dirt invading into the air cleaner through the drain hole. The present invention has been conceived to satisfy this demand.

SUMMARY OF THE INVENTION

In order to solve the above described problems, the air cleaner of the present invention includes an inside of an air cleaner case which is partitioned into a clean room and a dirty room by an air cleaner element. The clean room is connected to an engine and an intake hole leading to the atmosphere is provided in an upper part of the dirty room. Furthermore, a drain hole is provided in a lower part of the dirty room and a baffle plate is provided on an extension of an axis of a passage section of the drain hole.

With the above-described structure, even if water and dirt invade into the inside of the dirty room from the drain hole, since a baffle plate is provided on an extension of the axis of the passage of the drain hole, the water and dirt are stopped by this baffle plate. In this way, it is difficult for the water and dirt to invade any further. As a result, the water and dirt do not become directly attached to the air cleaner element. Therefore, it is possible to improve the durability of the air cleaner element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
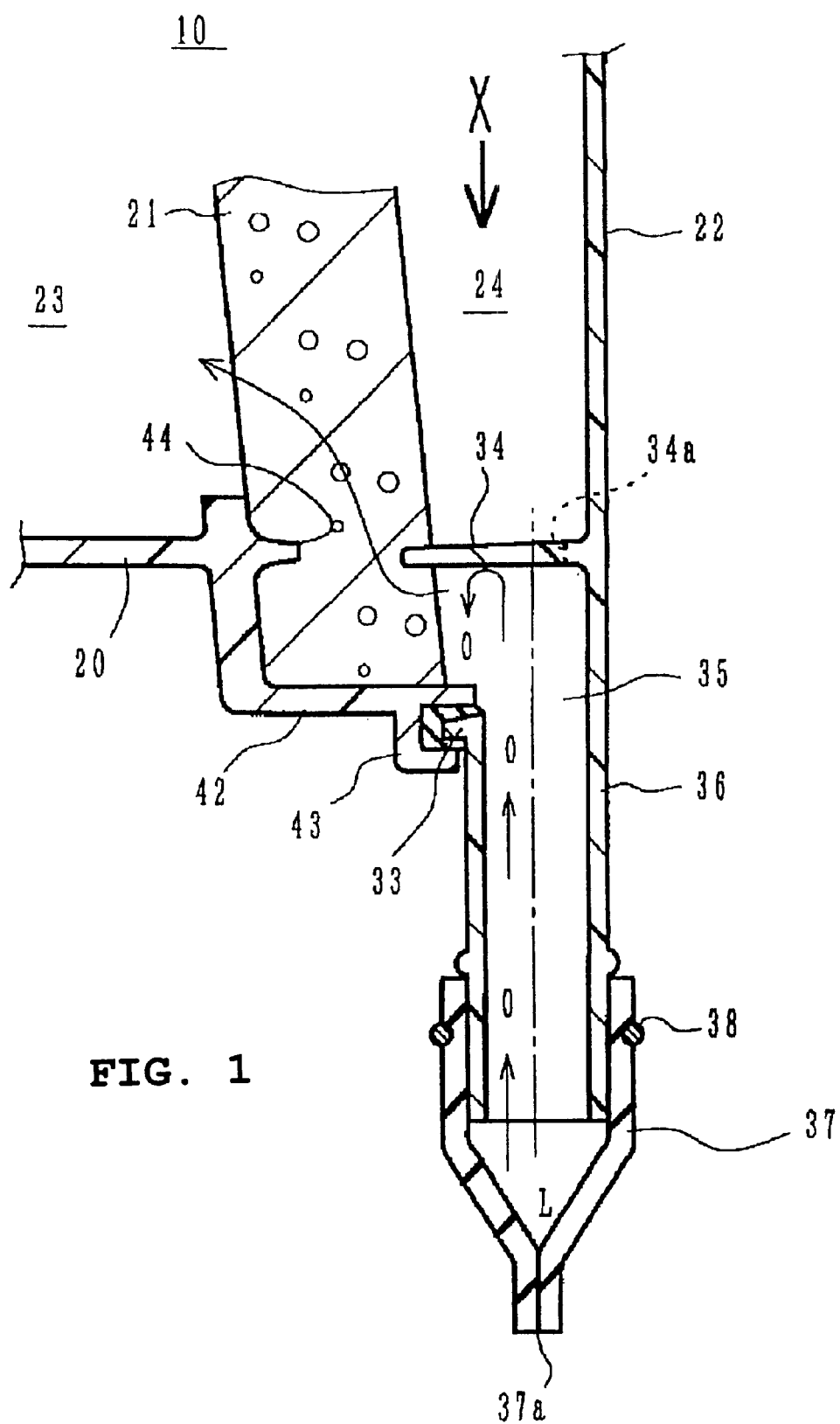
FIG. 1 is a cross sectional drawing of a drain portion of an air cleaner of the present invention along line 1—1 in FIG. 3.
Figure 2:
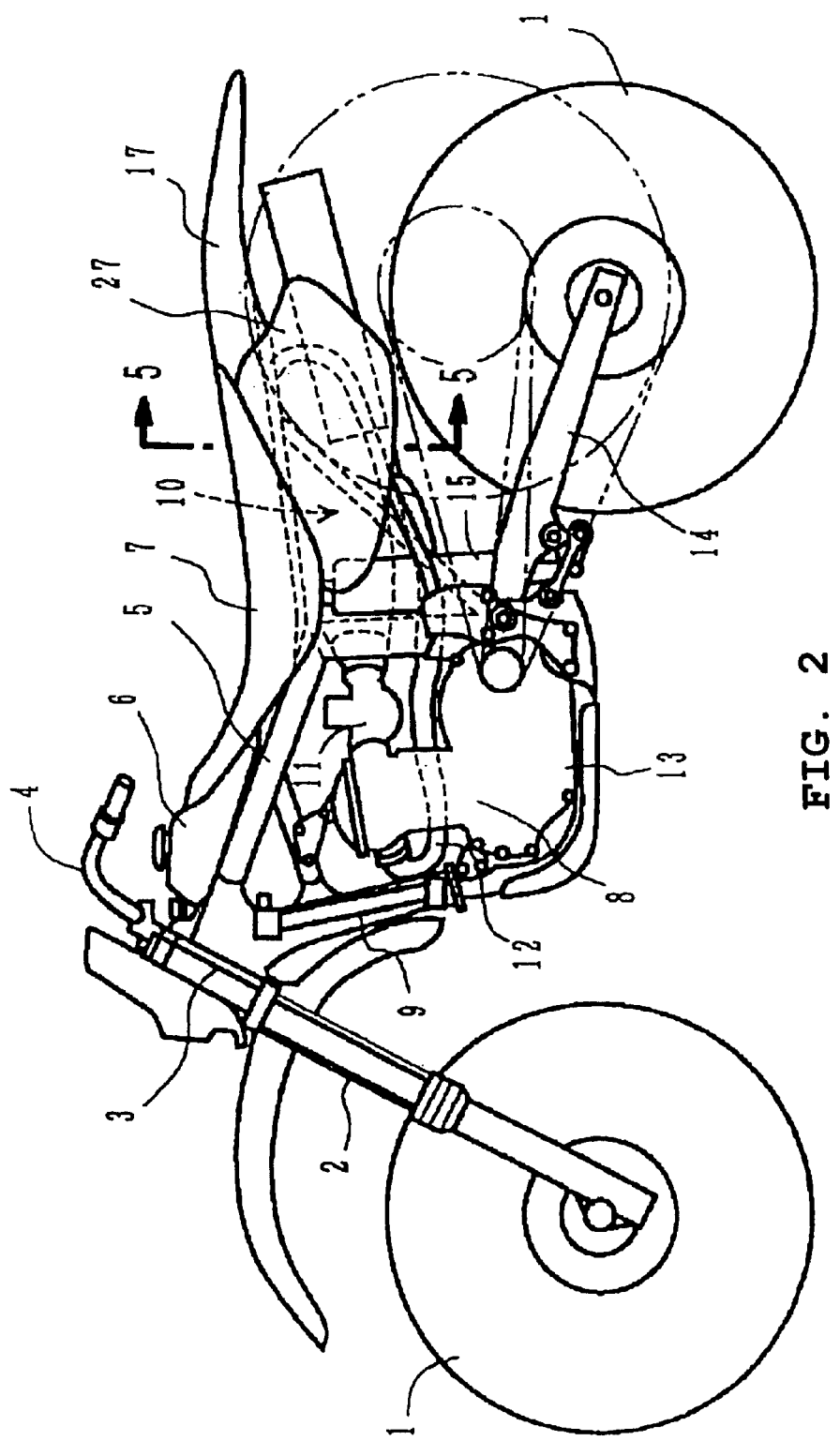
FIG. 2 is an overall side elevation of a motorcycle adopting the air cleaner of the present invention.
Figure 3:
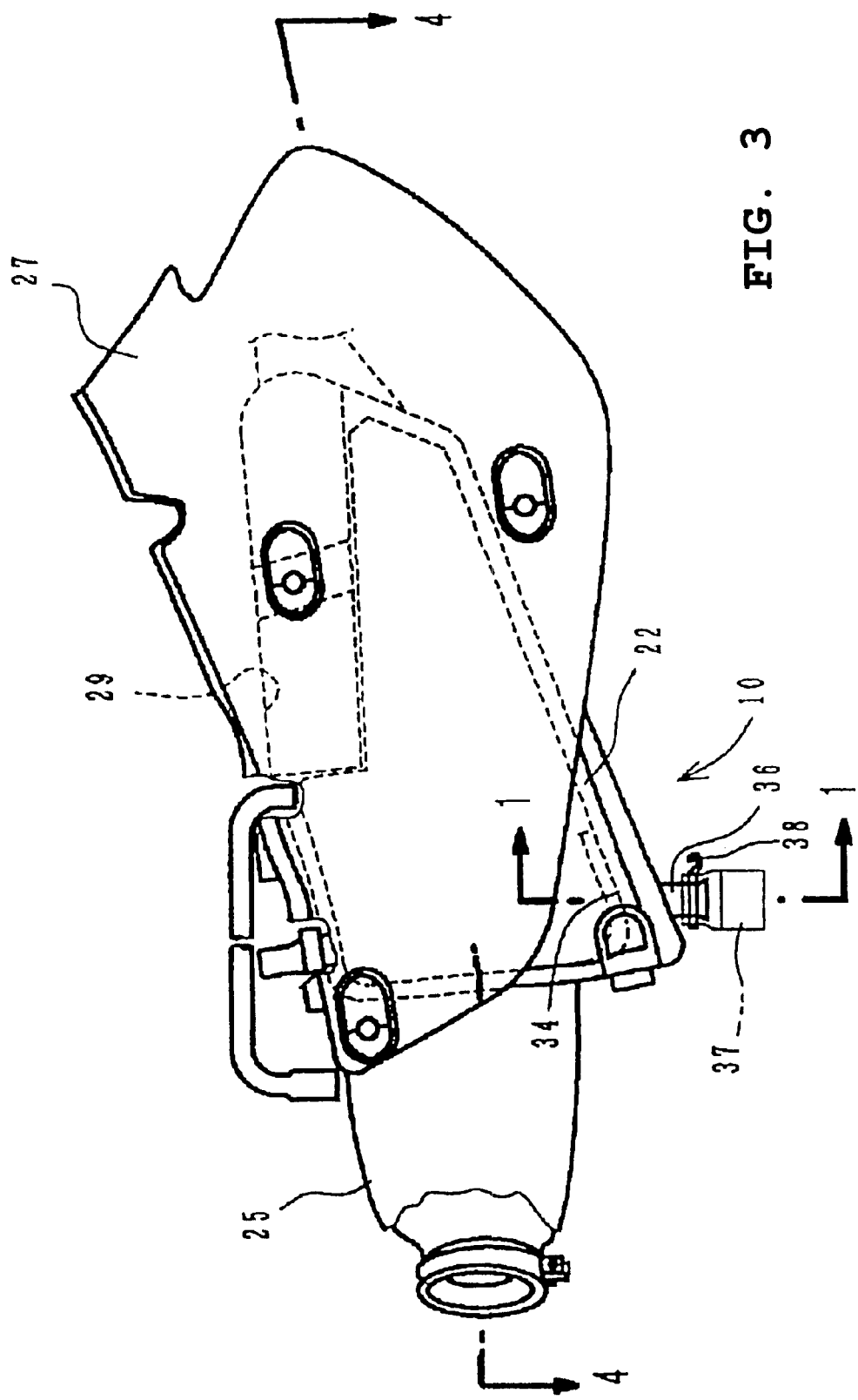
FIG. 3 is a side elevation of the air cleaner of the present invention.
Figure 4:
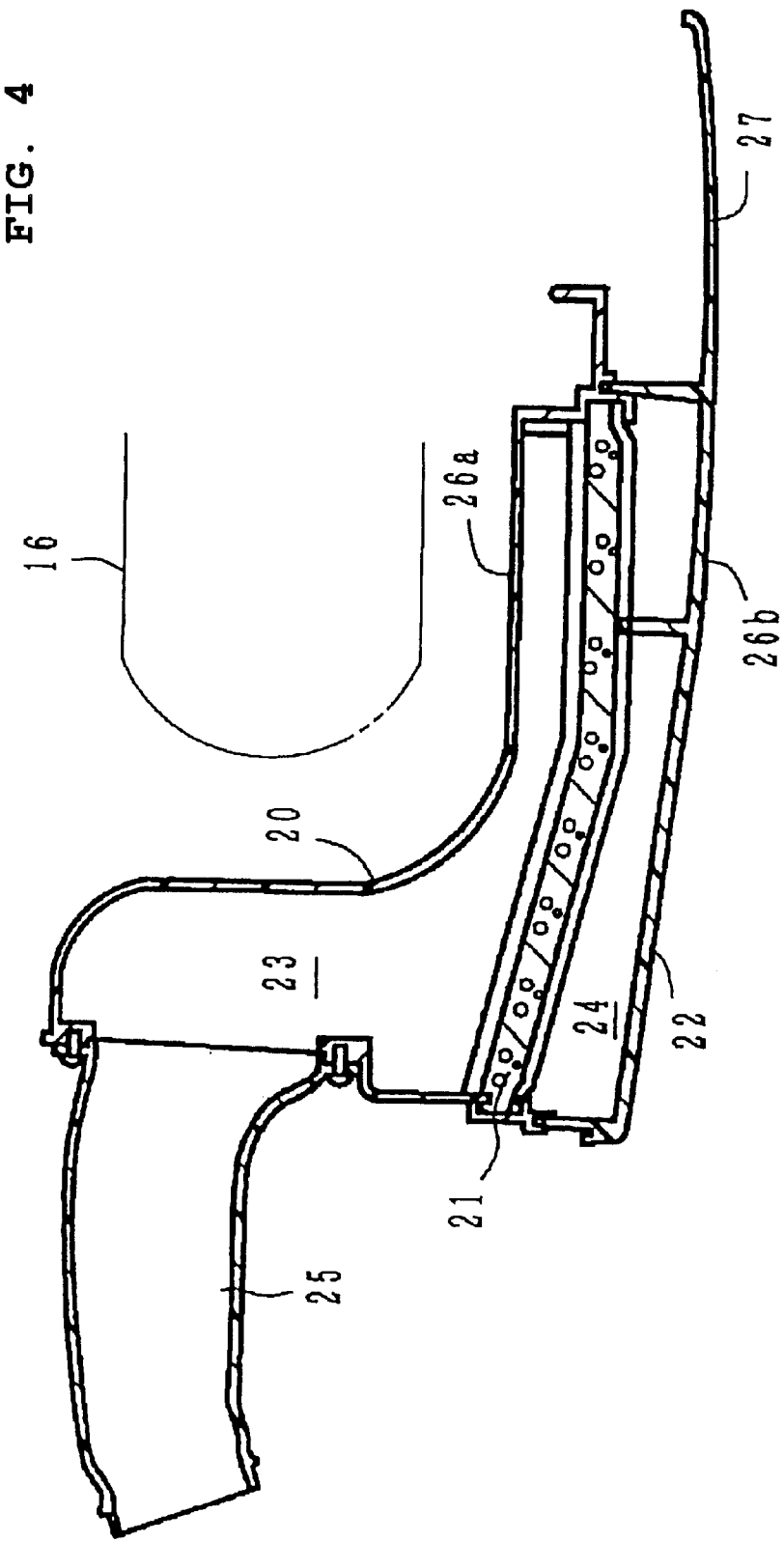
FIG. 4 is a cross sectional drawing along line 4—4 in FIG. 3.
Figure 5:
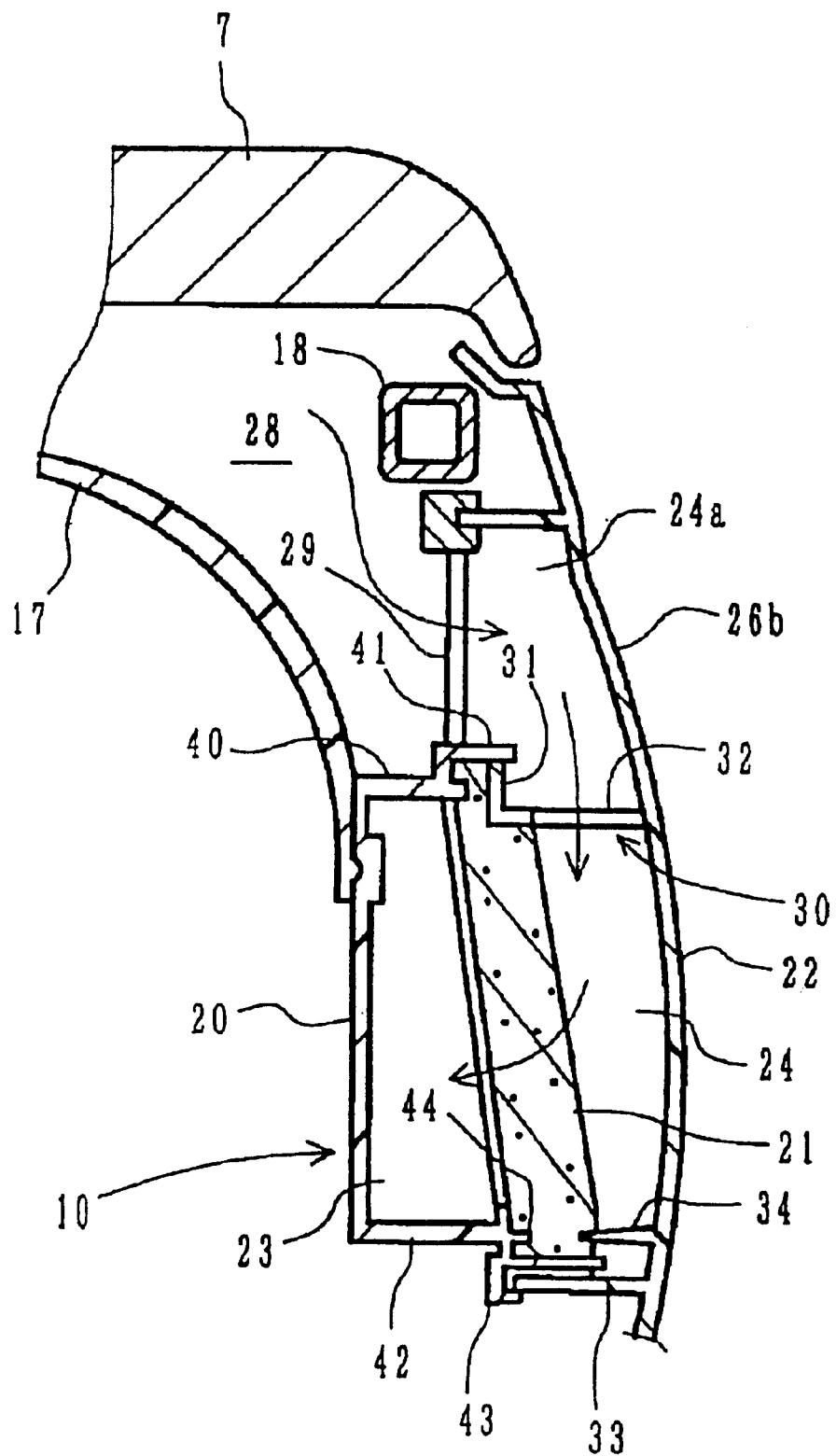
FIG. 5 is a cross sectional drawing along line 5—5 in FIG. 2.
Figure 6:
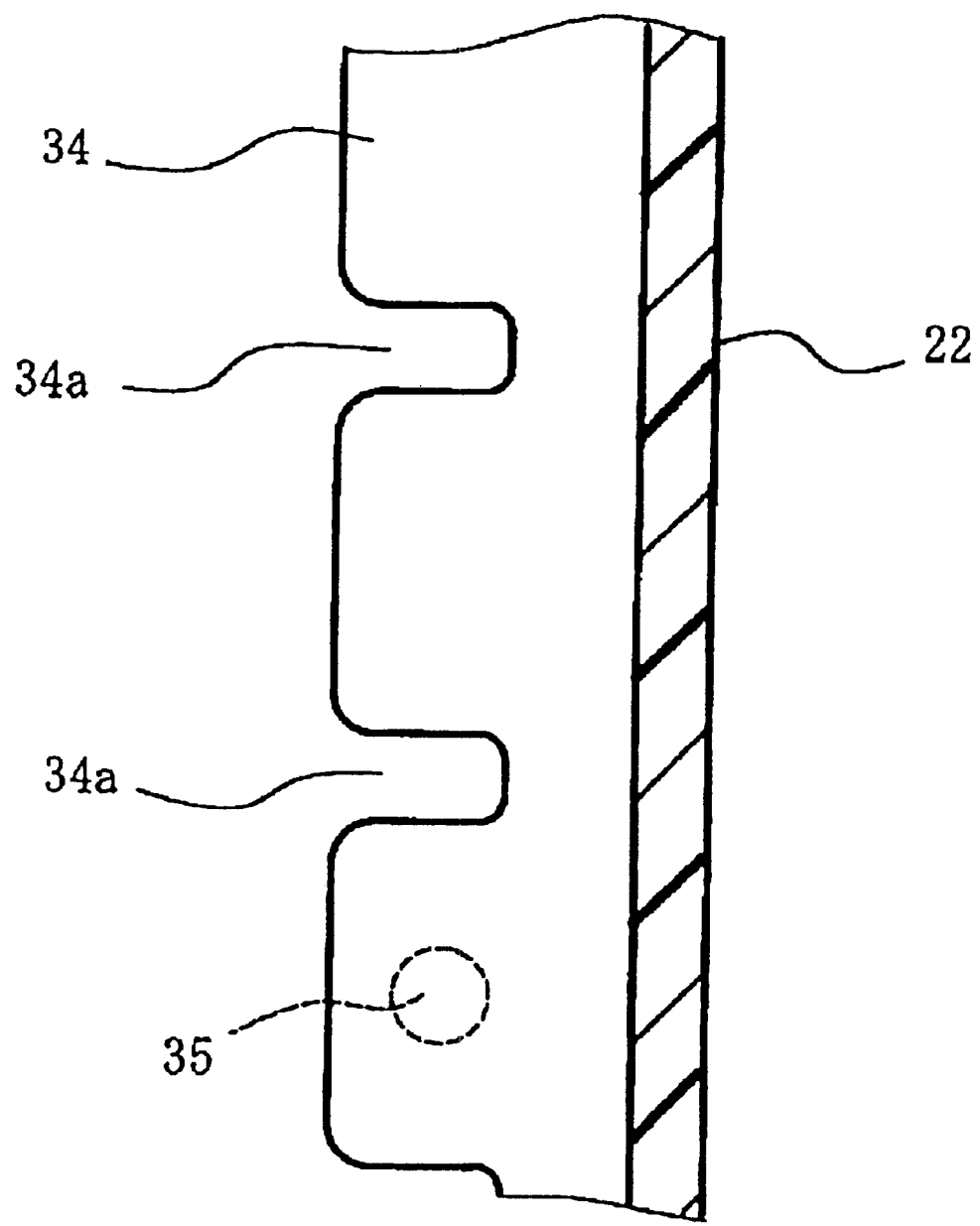
FIG. 6 is a schematic drawing of a rib shown in the direction of arrow X in FIG. 1.

Embodiments of the present invention will now be described with reference to the attached drawings. FIG. 1 is a cross sectional drawing along line 1—1 in FIG. 3 showing the drain structure of an air cleaner of an embodiment of the present invention; FIG. 2 is an overall side elevation of a motorcycle adopting the embodiment of the present invention; FIG. 3 is a side elevation of the air cleaner; FIG. 4 is a cross sectional drawing along line 4—4 in FIG. 3; FIG. 5 is a cross sectional drawing along line 5—5 in FIG. 2; and FIG. 6 is a schematic drawing of a rib shown in the direction of arrow X in FIG. 1.

First of all, the general structure of a motorcycle adopting the embodiment of the present invention will be described with reference to FIG. 2. Reference numeral 1 represents a front wheel, reference numeral 2 represents a front fork, reference numeral 3 represents a head pipe, reference numeral 4 represents a handle bar, reference numeral 5 represents a vehicle frame, reference numeral 6 represents a fuel tank, reference numeral 7 represents a seat, and reference numeral 8 represents an engine. engine 8 is a water cooled engine, with coolant cooled in a radiator 9. The engine 8 has intake from an air cleaner 10 arranged underneath the seat 7 via a carburetor 11, and exhaust from an exhaust port via an exhaust pipe 12.

A rear swingarm 14 supported so as to swing on the vehicle frame 5 behind a crank case 13 has a rear cushion unit 15 attached at a center section thereof. The rear swingarm 14 supports a rear wheel 16 at a rear end section thereof.

The rear wheel 16 overlaps the side of an air cleaner case 10, when viewed from the side. The rear wheel 16 does not obstruct the air cleaner case 10, even at the position of the imaginary line in FIG. 2, when the rear wheel 16 is at its maximum upward displacement. In this way, it is possible to locate the rear wheel 16 close to the engine 8, and to increase the capacity of the air cleaner.

As shown in FIGS. 3 and 4, the air cleaner 10 is comprised of an air cleaner case 20 opening out to one side of the vehicle (the left side of the vehicle). and an air cleaner element 21 and case cover 22 partitioning the inside of the air cleaner case 21. As is clear from FIG. 4, the inside of the air cleaner case 20 is partitioned in a widthwise direction of the vehicle into a clean room 23 and a dirty room 24 by the thin plate air cleaner element 21 extending in a longitudinal direction.

The clean room 23 has substantially an L shape viewed in plan. A front side section of the clean room 23 extends from one side (the left side of the vehicle) along the leading edge of the rear wheel 16 to the other side (the right side of the vehicle). One end of a connecting tube 25 is connected to a front part of the section extending to the other side. The other end of the connecting tube 25 is connected to a carburetor 11. Clean air is supplied from the air cleaner 10 to the carburetor 11.

A rear part of the clean room 23 extends along the side of the rear wheel 16, when viewed in plan, and the dirty room 24 also extends along one side of the vehicle, substantially parallel to a rear section of the clean room 23.

By providing the clean room 23 and the dirty room 24 extending a long way in a longitudinal and vertical direction of the vehicle, the clean room 23 and the dirty room 24 are respectively sufficiently increased in capacity. At the same time, the air cleaner 10 can be made compact without any lateral overhang.

Rear extension sections 26a and 26b extending to the side of the rear wheel 16, when viewed in plan, and respectively corresponding to rear sections of the clean room 23 and the dirty room 24 are provided in the air cleaner case 20 and the case cover 22, respectively. Furthermore, in addition to the main body sections, a, rear cover 27 extending further rearward than the rear extension section 25b is formed integrally with the case cover 22.

As is clearly shown in FIG. 5, an upper part of the rear extension section 26b, being a rear part of the case cover 22, extends upwards further than the rear extension section 26a that is a rear part of the air cleaner case 20. Furthermore, the upper part of the rear extension section 26b runs along an outer side of the seat rail 18 to the seat 7, and forms a space 28 leading to the atmosphere between the seat 7 and the rear fender 17.

A lateral opening section 29 opening to the side is formed in a vertical wall section for partitioning the dirty room 24 and the space 28 at an upper section of the rear extension section 26a of the air cleaner case 20. The space 28 and a rear upper chamber 24a of the dirty room 24 are connected together by the lateral opening section 29. The lateral opening section 29 replaces a rearwardly extending duct in the related art, which can be omitted.

A rear shoulder of the air cleaner element 21 is cut away so that it does not overlap the lateral opening 29. Furthermore, the air cleaner element 21 has filter surfaces arranged substantially parallel to the vertical and longitudinal directions of the vehicle. This means that it is easy to have a structure in which the surface area of the air cleaner element 21 is large and ventilation efficiency is increased.

An upper wall section 30 of the dirty room, projecting towards the inside, is integrally formed at an inner side of the case cover 22, with a projecting end section 33 of the upper wall section 29 supporting an upper end section of the air cleaner element 21. An intake hole 32, which opens upwards, is formed in the upper wall 30 in order to connect the space 28 with the dirty room 24, through the rear upper chamber 24a and the lateral opening section 29.

A bottom wall section 33, projecting from an inner side of a lower end of the case cover 22 towards the inside, is integrally formed lower than the upper wall section 30 of the dirty room. A rib 34 provided just above the bottom wall section 33 supports a lower end of the air cleaner element 21.

Furthermore, as will be clearly understood from FIG. 1, a drain hole 35 is provided in a front section of the bottom wall section 33. The drain bole 35 opens outwardly downwardly. Furthermore, the drain hole 35 connects to a drain pipe 36 formed projecting integrally downwardly from a lower section of the bottom wall section 33. A drain tube 37 is connected to a lower end of the drain pipe 36 using a clip 38.

The drain tube 37 is suitable as a passage section of the drain hole 35, and is formed from a suitable material having flexibility, such as rubber. A lower end of the drain tube 37 is formed into an opening and closing slit 37a. The slit 37a is normally closed, and only opens when water, etc. is discharged from the inside of the dirty room 24 to the outside, in the same manner any of the well known one-way valves.

The axis L of the drain pipe 36 passes through the center of the drain hole 35 and the slit 37a, and the rib 34 is provided on the inside of the dirty room 24 crossing an upward extension of the axis L. The rib 34 has a tapered cross section, becoming thinner towards its tip, and constitutes a member functioning as a baffle plate of the present invention.

Also, as will be clear from FIG. 6, schematically showing the rib 34 from the direction of arrow X in FIG. 1, slits 34a are cut into the rib 34 at suitable intervals along its length. The drain hole 35 overlaps the rib 34 in the direction of the axis L (FIG. 1), and the slits 34a are arranged at positions away from the axis L so that they do not overlap the drain hole 35.

On the other hand, as will be clearly understood from FIG. 1 and FIG. 5, an upper wall section 40, projecting outwardly, is also provided in the air cleaner case 20. A projecting end 41 of the upper wall section 40 engages with the projecting end 31 so that the upper end of the air cleaner element 21 is sandwiched between the projecting end 31 and the upper wall 40.

A lower wall section 42 of the air cleaner case 20 is provided projecting outwards below the upper wall 40. A projecting end of the lower wall section 33 is fitted into a grooved section provided in a projecting end 43 of the lower wall section 42. Furthermore, a rib 44 provided just above this grooved section sandwiches a lower end of the air cleaner element 21 together with the rib 43.

The operation of the embodiment of the present invention will now be described. As shown in FIG. 5, outside air enters into the inside of the rear upper chamber 24a through the space 28 and the lateral opening section 29, enters into the dirty room 24 from the intake hole 32. Inside the dirty room 24, the flow is changed toward the center of the vehicle so that air is cleaned by the air cleaner element 21 and enters the inside of the clean room 23. After that, air in a front section of the clean room 23 flows to the other side and is supplied from the connecting tube 25 to the carburetor 11.

At this time, the majority of moisture penetrating into the dirty room 24 together with the outside air through the lateral opening section 29 and the intake hole 32 is suitably subjected to vapor-liquid separation because the air flow winds in a labyrinthine shape, the moisture component flows downwards via the rib 34 and the slits 34a into the dirty room 24, and is discharged to the outside from the drain hole 35 through the drain pipe 36.

The inside of the air cleaner 10 is repeatedly alternating between positive pressure and negative pressure due to intake pulsation of the engine 8 connected via the connecting tube 25. This means that when the air cleaner is at negative pressure, external air is sucked in to a certain extent even if the slit 37a of the drain tube 37 is closed. In such a case, water and dirt as well as air are sucked in through the slit 37a, and sometimes penetrate inside the dirty room 24 from the drain pipe 36 through the drain hole 35.

However, a large part of the water and dirt that are sucked in in this way run along the axis L of the drain pipe 36 and penetrate into the dirty room 24, but because the rib 34 is positioned in an extension of this axis L, they collide with this rib 34.

As a result, the rib becomes a type of baffle plate with respect to the water and dirt. It is therefore difficult for the water and dirt to pass the rib 34 and penetrate to the other side. This means that the amount of water and dirt that stick directly to the air cleaner element 21 can be made extremely small, resulting in improved durability of the air cleaner element 21.

Accordingly, this structure is well suited to vehicles that are prone to the invasion of water and dirt, such as off-road motorcycles and buggy type vehicles. However, it goes without saying that it can also be applied to on-road motorcycles and other vehicles.

Furthermore, since the rib 34, integral with the case cover 22, and supporting the air cleaner element 21, is used as a baffle plate, there is no longer any need to provide a dedicated baffle plate. This makes it possible to simplify the structure and reduce the manufacturing cost. However, it is still possible to provide a baffle plate independently of the rib 34, and to make the baffle plate separate from the case cover 22.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air cleaner for a vehicle, comprising:

an air cleaner case, said air cleaner case having an inside partitionable into a clean room and a dirty room by an air cleaner element, said air cleaner element having a filter surface which is arranged substantially parallel in a vertical and longitudinal direction;

said clean room is connectable to an engine of the vehicle, an upper part of the dirty room includes an intake hole leading to the atmosphere formed therein, and a lower part of the dirty room includes a drain hole formed therein; and a baffle plate is provided on an extension of an axis of said drain hole, said baffle plate is integrally formed with a case cover to support said air cleaner element.

2. The air cleaner for a vehicle according to claim 1, wherein said baffle plate is provided within said dirty room and spaced above a location of an opening of said drain hole.

3. The air cleaner for a vehicle according to claim 1, wherein said drain hole includes a drain pipe projecting downwardly from said lower part of the dirty room, and a drain tube connected to a lower end of said drain pipe, said baffle plate being provided within said dirty room and spaced above a location of an opening of said drain hole.

4. The air cleaner for a vehicle according to claim 1, wherein said baffle plate includes slits formed therein at a plurality of locations along a length of said baffle plate, said slits being located at positions away from the axis of the drain hole, so the slits do not overlap the drain hole.

5. A motorcycle, comprising:

a vehicle frame;

an engine mounted to said vehicle frame;

a front fork and a handle bar mounted for rotation on said vehicle frame;

a front wheel mounted to said front fork;

a rear wheel mounted to said vehicle frame by a swing arm; and an air cleaner, said air cleaner including:

an air cleaner case, said air cleaner case having an inside partitioned into a clean room and a dirty room by an air cleaner element, said air cleaner element having a filter surface which is arranged substantially parallel in a vertical and longitudinal direction;

said clean room is connected to said engine, an upper part of the dirty room includes an intake hole leading to the atmosphere formed therein, and a lower part of the dirty room includes a drain hole formed therein; and a baffle plate is provided on an extension of an axis of said drain hole, said baffle plate is integrally formed with a case cover to support said air cleaner element.

6. The motorcycle according to claim 5, wherein said baffle plate is provided within said dirty room and spaced above a location of an opening of said drain hole.

7. The motorcycle according to claim 5, wherein said drain hole includes a drain pipe projecting downwardly from said lower part of the dirty room, and a drain tube connected to a lower end of said drain pipe, said baffle plate being provided within said dirty room and spaced above a location of an opening of said drain hole.

8. The motorcycle according to claim 5, wherein said baffle plate includes slits formed therein at a plurality of locations along a length of said baffle plate, said slits being located at positions away from the axis of the drain hole, so the slits do not overlap the drain hole.

9. The motorcycle according to claim 5, further comprising a seat and a rear fender mounted to said vehicle frame, said intake hole of said dirty room is in communication with a space formed between said seat and said rear fender.

10. The motorcycle according to claim 5, wherein said air cleaner is attached to a rear of the motorcycle, said air cleaner case being in overlapping relationship in a longitudinal direction of the motorcycle with said rear wheel.

11. The motorcycle according to claim 5, wherein said engine includes a carburetor mounted thereon, and said clean room is connected to the engine via a connecting tube extending from said clean room to the carburetor.

* * * * *